3,150,914
MEANS FOR APPLYING TIMING MARKS
Gardner P. Wilson, Pasadena, Rafn Stefansson, Sierra Madre, and Antoni Szymanski, Los Angeles, Calif., assignors to Clevite Corporation, a corporation of Ohio
Filed Aug. 30, 1962, Ser. No. 220,448
9 Claims. (Cl. 346—107)

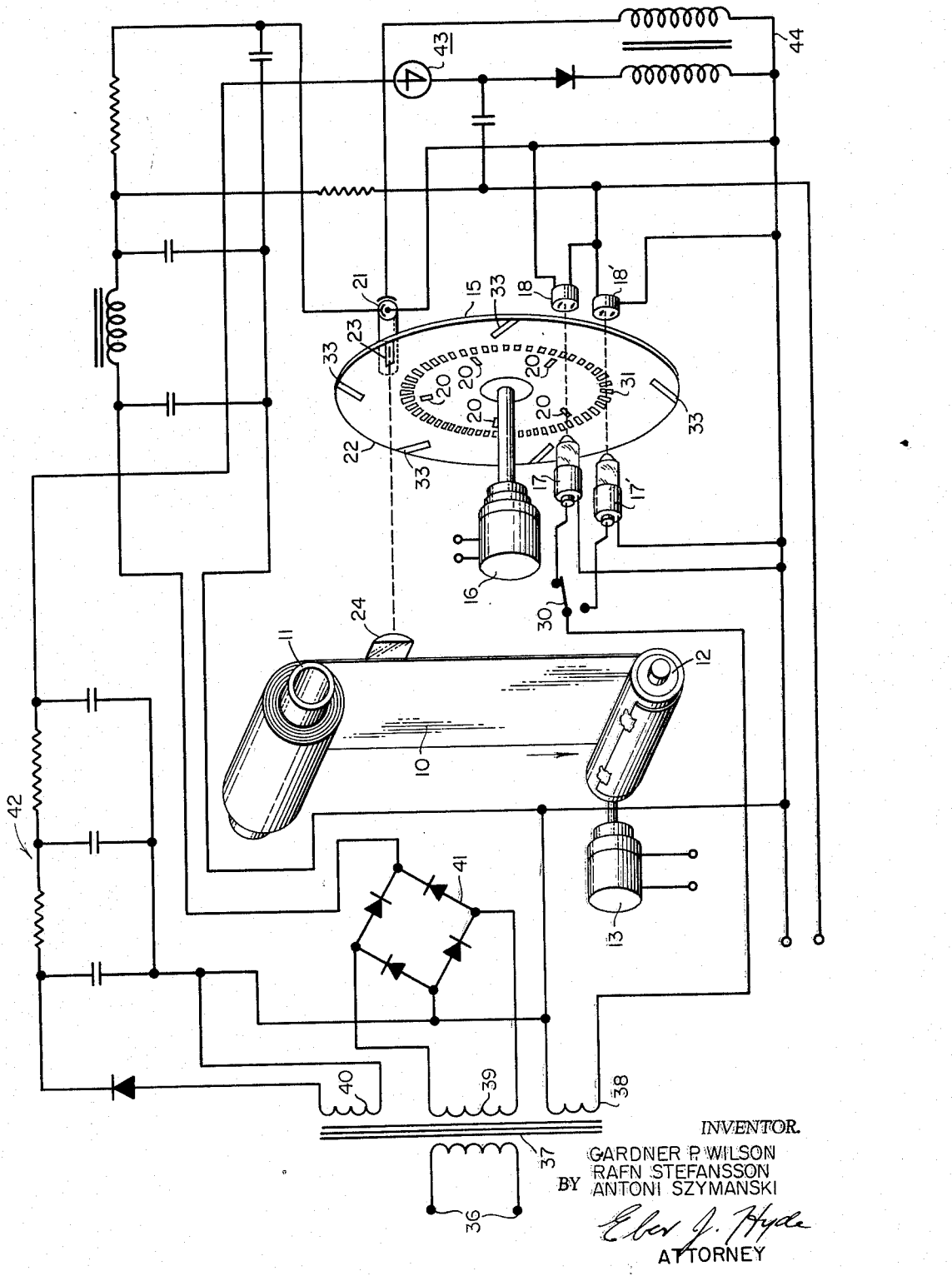

This invention pertains to means for applying timing marks to a moving strip of light sensitive material, such as sensitive paper, film, or the like, and is particularly useful for applying timing lines to moving record charts of recording instruments such as oscillographs.

In the broad field of oscillographs for recording electrical phenomena, whether the phenomena originate as an electrical impulse or as some other physical phenomena which is converted into an electrical impulse, it is often important to know the time relationship of the phenomena to each other. For example: in the recording of a plurality of seismic traces the time relationship of each trace in respect to each other trace is of importance, and also in the recording of a series of events connected with the launching of a rocket it is important to know the sequence of events as they take place. In order to do this a moving strip of light sensitive paper has a plurality of traces recorded on it, and it also has recorded on it a large number of timing lines extending across the strip of paper or film in a direction perpendicular to the direction of motion of the strip. These timing lines are equally spaced and preferably are applied to the chart simultaneously with the recording of the data.

The device of the present invention is an accurate, inexpensive means for providing timing lines on a moving strip or chart of light sensitive material, and it accentuates certain regularly occurring lines in order to facilitate counting the lines; for example, when 100 lines per second are applied to the film, every tenth line is made darker, and when 10 lines per second are applied, every fifth line is made darker. This facilitates counting the timing lines in order to calculate time differences between phenomena, and it also applies to the record track a distinguishing indication of the time base which was used during the recording of the phenomena. Without this distinguishing characteristic an engineer studying the record at a later time might not know how fast the record track was moving when the record was made.

It is therefore an object of the invention to provide a means or system for applying regular timing lines to a moving strip of record material, and for accentuating certain regularly occurring lines.

Still another object of the present invention is to provide a system in a light beam oscillograph to apply timing lines to a moving strip of light sensitive material, and to accentuate every fifth or tenth line at the desire of the operator.

For a better understanding of the present invention, together with other and further objects thereof, reference is had to the following description taken in connection with the accompanying drawing, and its scope will be pointed out in the appended claims.

The single drawing shows a circuit diagram and a diagrammatic drawing of the system of this invention.

With reference to the drawing the strip of film or light sensitive paper is indicated by reference character 10. It is contained on a supply roll 11 and it moves to a take-up roll 12 as motor 13 is energized.

Pulse generating means are provided which include a disc 15 which is rotated at a constant rate of speed by a synchronous motor 16, one or more incandescent lamps 17, 17' and one or more photocells 18, 18' on the side of the disc 15 opposite from the lamps 17, 17'. The disc 15 is rotated at a rate of two revolutions per second. Preferably the disc is opaque except that it has a series of five equally spaced transparent areas 20 located on a circle of a given diameter. The lamp 17 and the photocell 18 are so located on opposite sides of the disc 15 that light from the lamp 17 passes through each of the transparent areas 20 to the cell 18 as the disc 15 rotates. Thus in one second, since the disc rotates at two revolutions per second, ten light pulses will energize the cell 18 generating ten electrical pulses per second.

The photocell 18 is electrically connected to a flash lamp 21 to cause the flash lamp 21 to flash ten times per second. The flash lamp 21 is located adjacent the disc 15 so that only a portion (shown in solid lines) of it extends out beyond the edge 22 of the disc and a portion (shown in dotted lines) of its is behind the disc away from the record material 10. At the edge of the disc 15 there is a transparent area 23 which is adjacent to the flash lamp 21 once in each revolution (twice per second) at the exact instant that one of the five transparent areas 20 is between the incandescent lamp 17 and the photocell 18. At this instant the flash lamp 21 is fired and light from the exposed end of the flash lamp and the light which passes through the transparent area 23 both fall on the light sensitive paper 10, the lens 24 being used to focus the light in a fine line across the paper 10. This produces an intense line on the paper 10 once each revolution of the disc 15. However, the flash lamp 21 is fired five times during each revolution of the disc 15 because of the five transparent areas 20. Four of the five times that the lamp 21 is fired there is no transparent area 23 adjacent to the lamp 21. Consequently only the light from the exposed end of the lamp passes through the lens 24 and falls on the paper 10. Each of these four lines is much less intense than the fifth line. Thus the timing lines on the chart paper are applied at the rate of ten per second, and every fifth line is darker than the preceding four lines.

Usually the light sensitive chart 10 can be driven at a selected one of several speeds. When it is driven at a high rate of speed it is useful to apply a larger number of timing lines to the chart, and it is also helpful to have every tenth line emphasized by being darker. In this manner a person studying the recorded chart at a later date can distinguish between the 10 lines per second pattern and the 100 lines per second pattern and will know at what speed the chart was traveling when the record was made.

In order to record the timing lines at a higher rate, switch 30 is thrown to its alternate position, thereby energizing incandescent bulb 17' which projects its light through openings 31 to the photocell 18' which is connected to the flash lamp 21. There are fifty transparent openings 31 in a circumferential path around the disc 15. Since the disc rotates at a rate of 2 r.p.s., one hundred electrical pulses per second are applied to the flash lamp 21 causing it to fire one hundred times per second. Around the periphery of the disc 15 there are five regularly spaced transparent areas 33 each of which exposes the flash lamp 21 to the record chart 10 when it is aligned adjacent to the flash lamp 21. Thus by merely throwing switch 30, the operator can selectively apply ten timing lines per second with every fifth line emphasized, to one hundred timing lines per second with every tenth line emphasized.

Since the transparent areas 20 are on one diameter and the transparent areas 31 are on another diameter of the disc 15 and since they operate with different light sources and photocells, there will be no interference in the electric signals applied to the flash lamp 21. However, since the transparent area 23 (which is useful only to emphasize every fifth line when the ten lines per second are being recorded) and the five transparent areas 33 (which are useful only to emphasize every tenth line when one hundred lines per second are being recorded) are located on the edge of the disc 15, care must be exercised in their relative locations. The transparent slot 23 of the one timing system must be so located in relation to the transparent slots 31 of the other timing system that the flash lamp 21 is never fired by this other timing system when slot 23 is adjacent the flash lamp 21. If such a condition existed two spurious emphasized timing lines would be applied to the record chart every second when the higher frequency timing system was in operation.

Electrical energy for the system is derived from the input terminals 36 through the transformer 37. Secondary 38 of the transformer energizes either the light bulb 17 or the light bulb 17', depending upon the position of switch 30, and thus applies a light signal through the disc to the two photocells 18, 18'. Secondary 39 of transformer 37 is connected through the bridge rectifier 41 to the anode of the xenon flash lamp 21 to apply voltage thereto.

Secondary 40 of the transformer 37 through network 42 provides D.C. voltage to the 4-layer diode 43. Voltage from one of the photocells 18, 18' when it is energized by light through the disc 15 makes the 4-layer diode 43 conductive, and applies trigger voltage to the xenon flash lamp 21 and causes it to fire.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

We claim:

1. Means for applying timing marks to a moving strip of light sensitive material, comprising, in combination: pulse generating means including rotating means generating electric timing pulses, flash lamp means connected to said pulse generating means for establishing light flashes in accordance with the electric timing pulses, said rotating means including light modulating means positioned in relation to the light sensitive material and to the flash lamp means to modulate the light from said lamp which falls on said light sensitive material.

2. Means for applying timing marks to a moving strip of light sensitive material, comprising, in combination: pulse generating means including rotating means generating electric timing pulses, flash lamp means connected to said pulse generating means for establishing light flashes in accordance with the electric timing pulses, said flash lamp means being located to the side of said rotating means opposite to the side on which said light sensitive material is located, said rotating means including transparent areas and opaque areas for modulating the light from said flash lamp means which falls on said light sensitive material.

3. Means for applying timing marks to a moving strip of light sensitive material, comprising, in combination, pulse generating means for generating electric timing pulses including rotating means which have opaque areas and transparent areas, a source of light to one side of said rotating means, and a photocell on the other side of said rotating means to receive light which passes through said transparent areas; a flash lamp connected to said photocell through suitable amplifying means for establishing light flashes in accordance with the electric timing pulses, said flash lamp being located to the side of said rotating means opposite to the side on which said light sensitive material is located; the said opaque and transparent areas of said rotating means modulating the light from said flash lamp which falls on said light sensitive material.

4. Means for applying timing marks to a moving strip of light sensitive material, as set forth in claim 3, further characterized in that said rotating means includes two sets of transparent areas, one set being used by said pulse generating means and the other set being used to transmit the light from the flash lamp means to the light sensitive material.

5. Means for applying timing marks to a moving strip of light sensitive material, as set forth in claim 3, further characterized in that said rotating means includes a plurality of sets of transparent areas, the two sets being used one set at a time by said pulse generating means to generate light flashes of different frequencies, another set of transparent areas transmitting the higher frequency light flashes to the light sensitive record material, and still another area transmitting the lower frequency light flashes to the light sensitive record material.

6. Means for applying timing marks to a moving strip of light sensitive material, comprising, in combination: pulse generating means for generating electric timing pulses including an opaque disc which has a plurality of light transmitting areas, a source of light illuminating said transmitting areas, and a photocell adapted to receive said transmitted light; means for rotating said disc; flash lamp means connected to said photocell through suitable amplifying mans for establishing light flashes in accordance with the electric timing pulses, said flash lamp means being located to illuminate light transmitting areas of said disc as said disc rotates; and said strip of light sensitive material being located to receive light from said flash lamp means after it has been transmitted by said disc.

7. Means for applying timing marks of two different intensities to a moving strip of light sensitive material, comprising, in combination, an opaque disc having a plurality of transparent areas regularly spaced in a circumferential path around said disc, means rotating said disc, an incandescent lamp located adjacent said disc near said circumferential path of transparent areas, a photocell located on the opposite side of said disc to receive light from said incandescent lamp which passes through said transparent areas for establishing electric timing pulses, a flash lamp connected to said photocell through suitable amplifying means, said opaque disc having a second plurality of lght transmitting areas located to be illuminated by said light flashes, and said strip of light sensitive material being located to receive light from said flash lamp after it has passed through said second purality of light transmitting areas.

8. Means for applying timing marks to a moving strip of light sensitive material, comprising, in combination, an opaque disc having transparent areas, means for rotating said disc, a flash lamp located to one side of said disc away from said material and with said disc overlapping a portion only of said flash lamp to establish another portion of said lamp which is always exposed to said strip of record material, means for periodically flashing said lamp whereby light from the always exposed portion of said lamp falls onto said moving strip of light sensitive material to make timing marks thereon of given intensity, said transparent areas of said rotating disc periodically passing between said lamp and said material thereby exposing an increased portion of said flash lamp to said record material thereby to make timing marks of increased intensity.

9. Means for applying timing marks of two different intensities to a moving strip of light sensitive material, comprising, in combination, pulse generating means including an opaque disc having spaced transparent areas near its edge, means for rotating said disc, flash lamp means connected to said pulse generating means and including a flash lamp located adjacent to and partially covered by said disc so that a portion only of said flash lamp is always exposed to said light sensitive material and so that the transparent areas periodically expose more of the flash lamp to the light sensitive material, whereby every flash of said flash lamp exposes a portion of said light sensitive material with a given amount of light, and periodically as a transparent area of said disc is positioned between said flash lamp and said material the material is exposed to a greater amount of light to establish a darker timing mark thereon.

References Cited in the file of this patent

UNITED STATES PATENTS

| | | | |
|---|---|---|---|
| 2,348,401 | Manzanera | | May 9, 1944 |
| 2,667,812 | Miller | | Feb. 2, 1954 |
| 2,952,504 | Path | | Sept. 13, 1960 |